United States Patent [19]

Schrödter et al.

[11] 4,279,876

[45] Jul. 21, 1981

[54] CONVERSION OF EXTRACTION RESIDUES ORIGINATING FROM PHOSPHORIC ACID DECONTAMINATION TO SOLID DEPOSITION PRODUCTS

[75] Inventors: Klaus Schrödter, Cologne; Reinhard Gradl, Hürth-Knapsack; Klaus-Peter Ehlers, Erftstadt; Wolfgang Scheibitz, Frankfurt am Main, all of Fed. Rep. of Germany

[73] Assignee: Hoechst Aktiengesellschaft, Fed. Rep. of Germany

[21] Appl. No.: 128,265

[22] Filed: Mar. 7, 1980

[30] Foreign Application Priority Data

Mar. 12, 1979 [DE] Fed. Rep. of Germany ....... 2909572

[51] Int. Cl.$^3$ .................. C01B 15/16; C01B 25/26
[52] U.S. Cl. .................. 423/305; 423/321 R; 423/321 S
[58] Field of Search .......... 423/305, 317, 318, 319, 423/320, 321 R, 321 S

[56] References Cited

U.S. PATENT DOCUMENTS 4,104,079  8/1978  Fujii et al. .................. 423/321 S

FOREIGN PATENT DOCUMENTS 2716795 10/1977 Fed. Rep. of Germany ....... 423/321 S
2657189  6/1978 Fed. Rep. of Germany .
2657190  6/1978 Fed. Rep. of Germany .

*Primary Examiner*—O. R. Vertiz
*Assistant Examiner*—Gregory A. Heller
*Attorney, Agent, or Firm*—Connolly and Hutz

[57] ABSTRACT

The invention relates to a process permitting acid salt residues, hereinafter called raffinates, which are obtained in the decontamination of phosphoric acid by extraction with a solvent, to be converted to solid deposition products, wherein the raffinates are admixed with a quantity of water necessary for them to ensure, after reaction with hydrate of lime or quicklime, the formation of an aqueous filterable suspension. More particularly, the raffinates are admixed with a quantity of hydrate of lime or quicklime necessary for them to ensure, after reaction and filtration of the suspension, the formation of a filter cake having a pH-value within the range 9 to 14. The reaction suspension is filtered as soon as it has assumed a pH-value within the range 5 to 8 and the resulting filter cake is allowed to react completely and deposited.

5 Claims, No Drawings

CONVERSION OF EXTRACTION RESIDUES ORIGINATING FROM PHOSPHORIC ACID DECONTAMINATION TO SOLID DEPOSITION PRODUCTS

The present invention relates to a process for converting raffinates which are obtained in the decontamination of phosphoric acid by extraction with a solvent, to solid deposition products, wherein the water-containing raffinates are reacted with solid hydrate of lime or quicklime.

In the decontamination of wet-processed phosphoric acid by extraction, it is customary for the crude acid to be extracted in countercurrent fashion with an organic solvent, such as an alcohol, ester, ketone or ether, commonly in the presence of sulfuric acid. During that treatment, free phosphoric acid goes forward into the organic solvent phase. The inorganic contaminants present in the crude acid, which consist essentially of iron, aluminum, magnesium and calcium with minor proportions of a series of heavy metal contaminants, e.g. copper, cadmium, nickel, zinc and chromium, the latter substantially in sulfate or phosphate form, are retained in aqueous solution or suspension and ultimately removed therefrom. Concerned are acid residues which have water-soluble contaminants, such as Zn, Cd, Cu, $P_2O_5$, therein and are therefore very difficult to dispose of inasmuch as it is not permissible, without further decontamination, for them to be delivered to an effluent water system.

It has been suggested (cf. German "Offenlegungsschriften" Nos. 26 57 189 and 26 57 190) that these acid residues should be treated with quicklime (CaO) and converted to a solid neutral product for deposition.

These two processes are, however, not fully satisfactory inasmuch as use has to be made therein of raffinate containing a quantity of water just necessary, after partial evaporation thereof by heat set free during reaction of the raffinate with quicklime, to ensure the formation of a solid product. In addition to this, these prior processes are technically difficult to carry out, e.g. in a kneader, which is liable to become heavily encrusted with reaction product and undergo mechanical wear.

These prior processes are also not satisfactory inasmuch as the resulting deposition product produces a neutral reaction. At the neutral point, a series of pollutants, especially zinc and copper salts and also orthophosphates, are water-soluble enough to appear in unduly high concentration in the ground water of the deposition site.

It is therefore an object of the present invention to provide a technically simple process permitting sulfuric and phosphoric acid-containing salt solutions, which are invariably obtained in the decontamination by extraction of wet-processed phosphoric acid, to be converted, irrespective of the water contained therein, to solid material of which the constituents are very sparingly water-soluble so that contaminants are not liable to become washed out and pollutively to concentrate in waste water.

To this end, the process of the present invention provides for the raffinates to be first admixed with a quantity of water necessary for them to ensure, after reaction with hydrate of lime or quicklime, the formation of an aqueous filterable suspension.

Next, the raffinates are admixed with a quantity of solid hydrate of lime or quicklime necessary for them to ensure, after reaction and filtration of the suspension, the formation of a filter cake having a pH-value within the range 9 to 14, preferably 9 to 10, in aqueous suspension.

Before the suspension has undergone complete reaction, i.e. as soon as it has assumed a pH-value within the range 5 to 8, preferably 6 to 7, it should be subjected to filtration. The resulting filter cake is allowed to react completely and deposited.

In order to establish the necessary water content in the raffinates, it is good practice wholly or partially to recycle filtrate which is obtained on subjecting the reaction suspension to filtration. It is even more preferable to establish in the raffinates a water content which is necessary for them, after reaction, to have 20 to 40 weight % of solid matter therein.

The composition of the raffinates is variable depending on the origin of phosphoric acid and the particular method used for decontaminating it. In other words, it is necessary by preliminary tests to determine in each particular case the exact quantity of hydrate of lime or quicklime, which should be added to the raffinates so as to have a reaction suspension producing a filter cake which has a pH-value within the range 9 to 14, in aqueous suspension.

The pH-value is determined on an aqueous suspension containing 10 weight % of solid matter.

The filtration can be effected with the use of a pressure or vacuum filter, preferably with the use of a continuously operated drum or belt filter of which the filter gauze should be continuously cleaned.

Unexpected results of the present process reside in the especially good filterability of the filter cake and in the fact that as early as during filtration, the filter cake become dehydrated to an extent necessary for it to be readily removable and transportable. The good filterability is a result of the fact that the reaction suspension comprised of raffinate and precipitant is filtered off at a pH-value close to the neutral point. At higher pH-values, i.e. in all those cases in which the suspension is allowed to react over a prolonged period of time, its filterability is liable to become impaired. Resulting filtrate is discarded or recycled, partially or completely, for diluting raffinates containing relatively little water. A further beneficial effect of the present process resides in the conversion of acid raffinate material to solid products producing a strongly alkaline reaction. During the conversion, all relevant pollutants, such as cadmium, chromium, zinc or $P_2O_5$, are converted to very difficultly soluble compounds which are not liable to appear in unduly high concentrations in the ground water of a deposition site.

The following Examples illustrate the invention which is naturally not limited thereto.

EXAMPLE 1

Placed in an agitator-provided container was 150 l/h of raffinate obtained in the decontamination by extraction with amyl alcohol of wet-processed phosphoric acid, based on Morocco phosphate. The raffinate which contained 58% $H_2O$, 22.3% $SO_4$, 8.6% $P_2O_5$, 0.9% Fe, 0.29% Cr, 0.21% Zn, 0.013% Cd was diluted with about 400 l/h of recycled filtrate and the whole was admixed with 80 kg/h of solid hydrate of lime. The reaction suspension which had a temperature of 80° C. was delivered to a container connected to a filter. At a pH of approximately 6, the suspension was filtered with the use of a vacuum drum filter (0.5 m$^2$) and filter cloth.

The filtration efficiency was 810 l/h.m² and 230 kg/h of filter cake which had a dry friable consistency was obtained. An aqueous suspension containing 10 weight % of solid matter made from the filter cake had a pH of about 11. Extraction tests were made on the solid residue (100 g solid matter/1000 g H₂O). The extracted matter was found to contain:

$P_2O_5$: <10 ppm
Cd: <0.005 ppm  Zn: <0.01 ppm  Cr: 0.01 ppm

EXAMPLE 2 (Comparative Example)

The procedure was as in Example 1, but the reaction suspension was filtered at a pH of 10. The filtration efficiency was reduced down to 680 l/h.m².

EXAMPLE 3 (Comparative Example)

The procedure was as in Example 1, but a suspension of hydrate of lime in water (160 l/h) was first prepared and then reacted with raffinate and recycled filtrate (240 l/h).

The filtration efficiency was 600 l/h.m², but a moist deliquescent cake was obtained.

EXAMPLE 4 (Comparative Example)

The procedure was as in Example 1, but the raffinate and recycled filtrate quantities were admixed with 65 kg/h of solid hydrate of lime. After filtration, the residue producing a neutral reaction was extracted with water as in Example 1. The extracted matter was analyzed and found to contain:

$P_2O_5$: 150 ppm
Cd: 0.02 ppm
Zn: 0.04 ppm
Cr: 0.31 ppm

We claim:

1. A process for converting raffinates, which are obtained in the decontamination of phosphoric acid by extraction with a solvent, to solid deposition products, wherein the water-containing raffinates are reacted with solid hydrate of lime or quicklime which comprises:
    (a) admixing the raffinates with a quantity of water necessary for them to ensure, after reaction with hydrate of lime or quicklime, the formation of an aqueous filterable suspension;
    (b) admixing the raffinates with a quantity of hydrate of lime or quicklime necessary for them to ensure, after reaction and filtration of the suspension, the formation of a filter cake having a pH-value within the range 9 to 14 in aqueous suspension;
    (c) filtering the reaction suspension, after incomplete reaction at a pH-value within the range 5 to 8; and
    (d) allowing the resulting filter cake to react completely and depositing it.

2. The process as claimed in claim 1, wherein the raffinates are admixed with a quantity of hydrate of lime or quicklime necessary for them to ensure formation of a filter cake having a pH value of 9 to 10 in an aqueous suspension.

3. The process as claimed in claim 1, wherein the reaction suspension is filtered at a pH value of 6 to 7.

4. The process as claimed in claim 1, wherein the raffinates are admixed with a quantity of water necessary to establish a solid matter content of 20 to 40 weight % therein.

5. The process as claimed in claim 1, wherein filtrate obtained on subjecting the reaction suspension to filtration is partially or completely recycled and used for establishing the water content in the raffinates.

* * * * *